United States Patent [19]
Smith

[11] 3,808,720
[45] May 7, 1974

[54] AUDIO-VISUAL DISPLAY APPARATUS

[76] Inventor: John Allen Smith, 1368 4th Ave., Coraopolis, Pa. 15108

[22] Filed: Dec. 29, 1971

[21] Appl. No.: 213,251

[52] U.S. Cl.......................... 40/28.3, 35/8 A, 40/35, 40/52 R, 40/104 A
[51] Int. Cl. ............................................ G09f 27/00
[58] Field of Search .......... 35/8 A, 8 R, 35 C, 35 B; 40/28.3, 35, 52 R, 53 R, 104 R, 104 A; 84/486, 487, 516–521

[56] References Cited
UNITED STATES PATENTS

| | | | |
|---|---|---|---|
| 3,220,126 | 11/1965 | Gabrielsen............................. | 40/28.3 |
| 3,654,619 | 4/1972 | Tishman ................................ | 35/6 X |
| 2,897,618 | 8/1959 | Russell.................................. | 40/104 R |
| 3,343,776 | 9/1967 | Wieszeck............................. | 84/521 X |
| 3,371,571 | 3/1968 | Barbera ............................... | 84/521 X |
| 3,550,296 | 12/1970 | Castagna............................ | 40/104 A |
| 3,234,664 | 2/1966 | Yaeger.................................. | 35/5 |

*Primary Examiner*—Robert W. Michell
*Assistant Examiner*—Vance Y. Hum
*Attorney, Agent, or Firm*—Carothers & Carothers

[57] ABSTRACT

An audio-visual display apparatus principally adapted to visually display media in the form of pages in a book together with a page turning arm so that the observer can visually see the intelligence printed on the pages of a book and hear such intelligence as recorded on a recording medium. The motor drive means operating the page turning arm is responsive to signals on the recording medium through control circuit means to cause the arm to rotate through an arcuate path carrying an individual page, to turn the page over and to return to its original position ready to carry over the next page. The signals on the recording medium are placed at predetermined positions on the medium to coincide with the intelligence printed on the pages so that upon complete reproducing of sonant stored intelligence for any one page, the page is turned over by the page turning arm.

11 Claims, 6 Drawing Figures

PATENTED MAY 7 1974

INVENTOR.
JOHN ALLEN SMITH
BY CAROTHERS & CAROTHERS
HIS ATTORNEYS

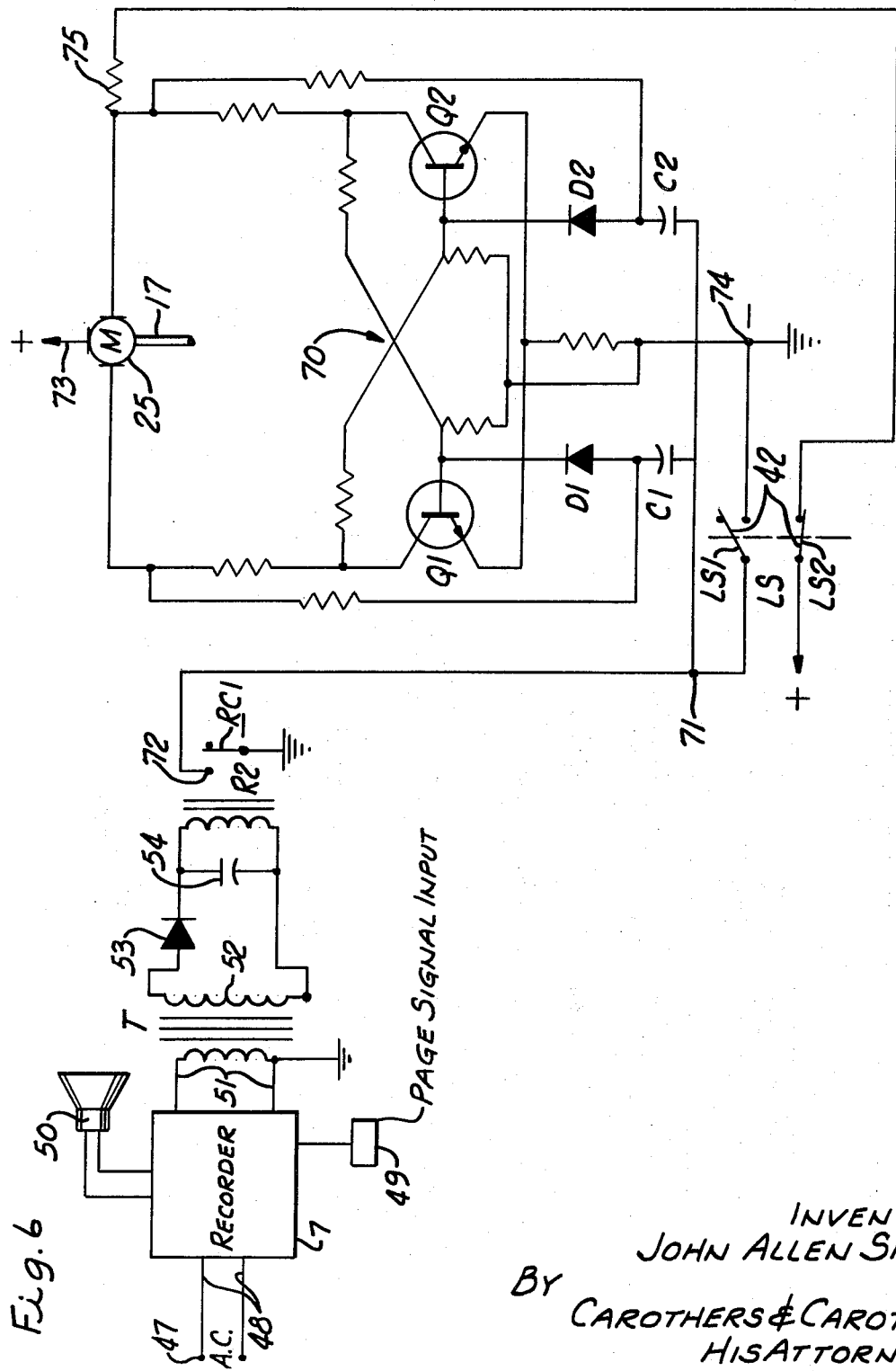

AUDIO-VISUAL DISPLAY APPARATUS

BACKGROUND OF THE INVENTION

This invention pertains to that area of art involving exhibitors and more particularly to changeable exhibitors controlled by sound circuit (40–28.3). Such an exhibitor as disclosed herein is referred to as an audio-visual display apparatus since the apparatus involves the exhibiting and showing of visual media in combination with audibly reproduced intelligence in some manner associated with the visual media.

The audio-visual apparatus of the type disclosed herein is not new in the art. One such device is shown in U.S. Pat. No. 3,220,126 (40–28.3) wherein aural reproducing means is used in combination with a visual media involving the selective displacement of individual pages in predetermined relation with the aurally-reproduced sound. This predetermined relationship is maintained by synchronizing signals pre-recorded at predetermined selective intervals on the recording medium.

The disadvantage of the apparatus shown in U.S. Pat. No. 3,220,126, is that it is adapted to operate only specially prepared visual media wherein each of the pages must be properly notched so that upon operation of the page release indexing mechanism, a page will be released and fall principally because of applied backing pressure and gravity. In many cases, what is needed is a page turning device in combination with an aural reproducing means which is adaptable to accept any size or shape of already existing visual media in the form of, for example, a book. As a teaching aid, for exceptional children, for example, what is needed is a visual display means capable of accepting standard or conventional books no matter their dimensional size so that the page indexing device can be so adjusted to bring about proper page turning dependent on page size and as programmed in conjunction with aural reproducing means.

Also, as far as page indexing devices are concerned, page turning devices are known in the art utilizing a page turning arm having magnetic means at its outer end adapted to engage an individual page for turning the page over as the arm moves over an arcuate path. Such a device is shown in U.S. Pat. No. 3,570,154 (40–35).

SUMMARY OF THE INVENTION

The principal feature of the present invention is an audio-visual display apparatus adapted to be programmed to accept and reproduce sonant stored intelligence maintained on a sonant recording medium, the intelligence which may or may not be derived from a visual media in the form of a book, the apparatus being such that it is capable of accepting any size book, the pages of which are to be automatically turned in a predetermined relation with the aurally produced sound from the recording medium.

In other words, the primary feature of the present invention resides in a comparatively inexpensive audio-visual display apparatus capable of indexing a series of pages of a conventional bound book by means of a page turning arm in programmed relation with sonant reproducing means, the page turning arm being operative from motor drive means responsive to inaudible signals positioned at predetermined locations on the recording medium. The page turning arm is adjustable so as to accommodate any standard book length and width so that the apparatus can be employed universally to any situation where such an audio-visual display apparatus of the type herein disclosed may be utilized.

One important use of the display apparatus of the present invention is to entice exceptional children to take an interest in storybook listening and reading. Through repetition of the sonant stored intelligence in combination with automatic page indexing of the same intelligence present in visual form in the storybook, a child will soon begin to take part in the story or message being portrayed including the making of motions and speaking in anticipation of what is to come next over the sonant recording medium and visually displayed upon sequential page indexing. Such a teaching aid helps to develop the mental and physical coordination of such children, particularly since they can speculate concerning the progress of the story and thereby take an active part in the story telling. Also, the recording medium can be programmed to include questions to be asked of the child concerning the story and thus perform a further teaching function.

Other objects and advantages appear in the following description and claims.

The accompanying drawings show, for the purpose of exemplification without limiting the invention or the claims thereto, certain practical embodiments illustrating the principles of this invention wherein:

FIG. 6 is a schematic diagram of solid state control circuit that may be substituted for the control circuit of FIG. 5.

Figure 1:
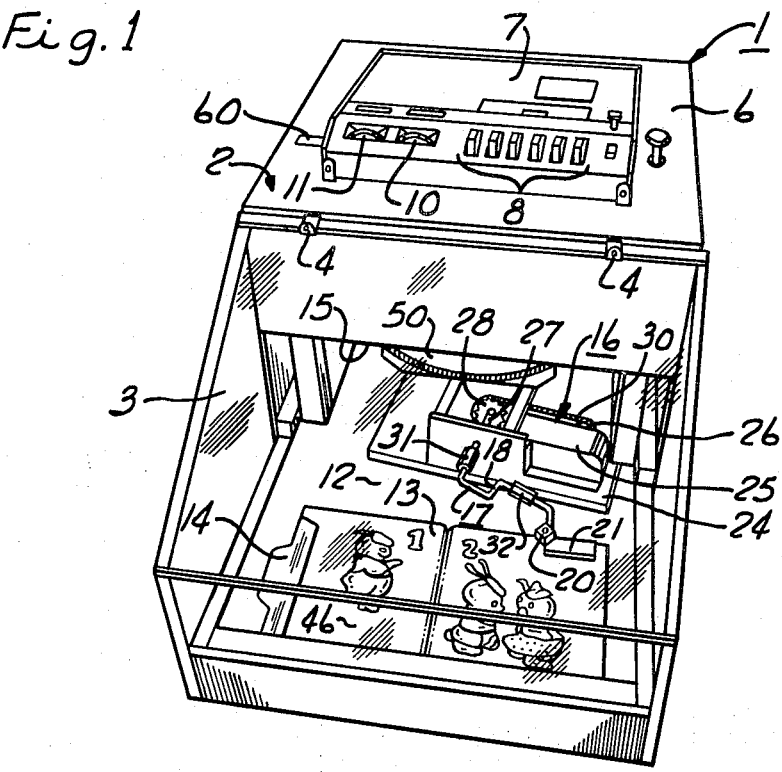
FIG. 1 is a perspective view of the audio-visual display apparatus comprising this invention.
Figure 2:
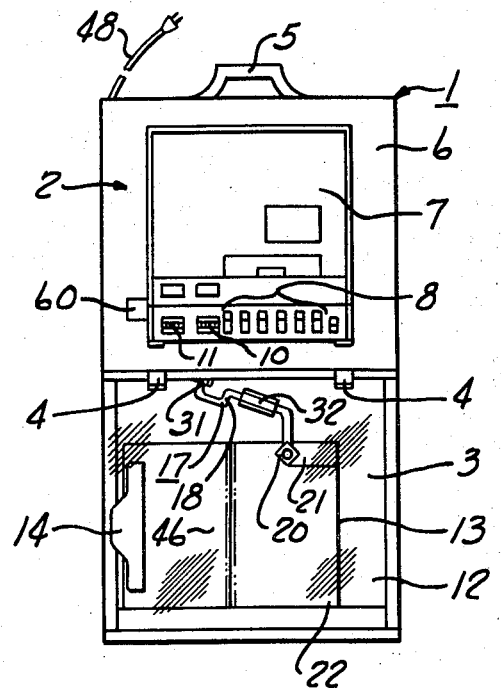
FIG. 2 is a plan view of the display apparatus shown in FIG. 1.

Referring to FIGS. 1 through 4, there is shown the audio-visual display apparatus 1 comprising this invention which consists of the housing 2, the forward portion of which there is attached by the hinges 4 the transparent cover or hood 3. As can be readily seen, the hood 3 swings upwardly toward the rear of the housing 2.

The housing 2 is provided at its rear wall with the handle 5 for easy transport of the apparatus 1. Also on the top deck 6 of the housing 2 there is provided means to reproduce sonant stored intelligence which is maintained on a sonant recording medium, in this case being the cassette tape recording machine 7. It should be understood, however, that any other sonant stored intelligence reproducing device may be utilized such as a phonograph record player.

The cassette tape player 7 is provided with the normal control buttons generally shown at 8 for controlling the tape player. The tape player 7, being of the stereo type, is also provided with recording level controls 10 and 11.

The forward end of the housing 2 is provided with the chamber 12 within which is received the visual media in the form of a book, such as the book 13 shown in the figures. The book 13 may properly be placed in the chamber and temporarily secured in position by means of the book clip 14 which is similar to the common clamping clip found on clip boards.

Figure 4:
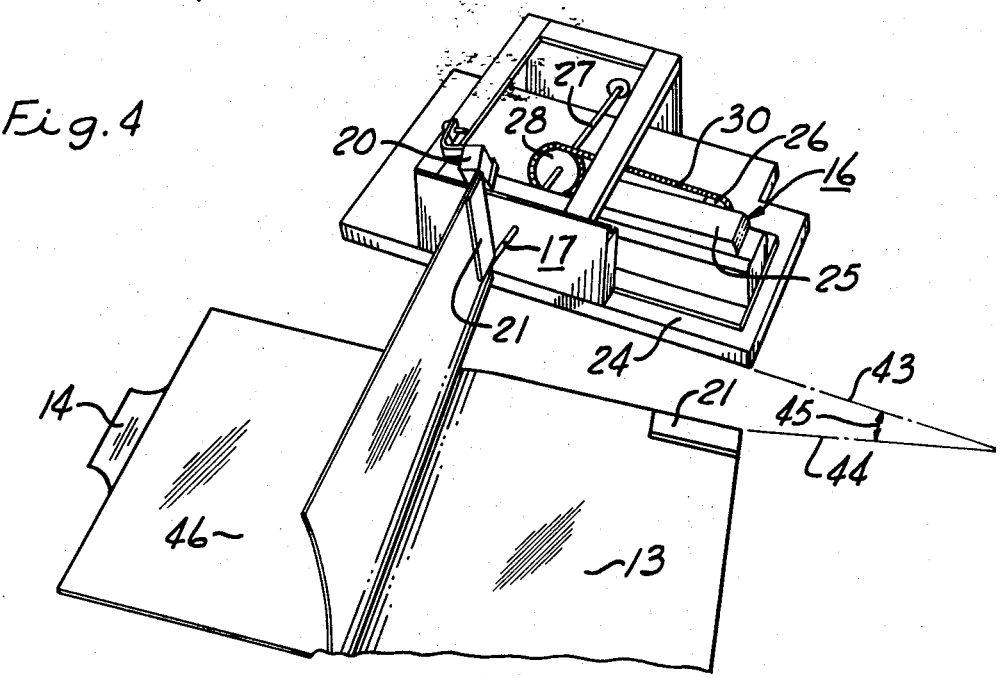
FIG. 4 is a perspective view of the page turning arm approximately one-half of the way through its cycle and at the position where the arm is beginning to become disengaged from the page being turned.

As can be seen from FIGS. 1 and 4, the housing 2 together with the deck 6 provide for an enclosed area or chamber 15 within which the circuitry for operating the cassette tape player 7 may be housed as well as the motor drive means 16 for operating the page indexing means in the form of the page turning arm 17. From close inspection of the figures, it can be seen that the page turning arm 17 comprises an arm body 18 the outer end of which is provided with the magnetic attracting means in the form of a permanent magnet 20. In this connection, it should also be noted that the book 13 on each of its pages is provided with a magnetic attracted means 21 in the form of a metal strip which are attracted by a permanent magnet 20 so that upon operation of the page turning arm 17, the page may be properly indexed. In order to insure that the magnet 20 does not undesirably index two pages at any one time, a plastic strip may be placed over each metal strip to insure engagement of each page consecutively. Also the metal strip identified at 21 may be of U-shaped in cross section to fit over the edge of the page, as well as the optional plastic strip which may also be U-shaped to fit over the metal strip 21. Also, an identical metal strip 21 may be placed at the lower bottom corner of the page, identified by dotted line at 22, to act as an equalizing weight to thereby aid in indexing the pages upon operation of the page turning arm 17.

Mention should be made here that various types of publications, such as books for exceptional children, can be provided with magnetic-type ink in the upper right-hand corner of each page when the publication goes to print. This eliminates the need for providing the extra metallic strips previously suggested as the magnetic attracted means.

Also, it is within the contemplation of this area of the invention that the attracting means be in the form of a suction type cup provided with a central aperture which is connected by tubular means to a suction supply. In this manner, pages can be individually gripped by suction power and individually turned by the page turning arm 17. The suction power can be controlled to be applied when the arm 17 is in its normal position as shown in FIG. 3 and terminated when the arm 17 is in the position shown in FIG. 4.

The book clip 14 is provided only to secure the book cover in position so that as the pages of the book 13 are turned, they will be deposited on the top of the book clip 14 as indicated in FIG. 4.

Also, mention should be made of the transparent hood 3 being added, but although not necessary, to insure that the child or person using the apparatus 1 will not interfere with the operation of the page indexing means. However, such person will have adequate visual opportunity to examine and see the contents of the book 13 while the tape player 7 and the page turning arm 17 are in operation.

Figure 3:
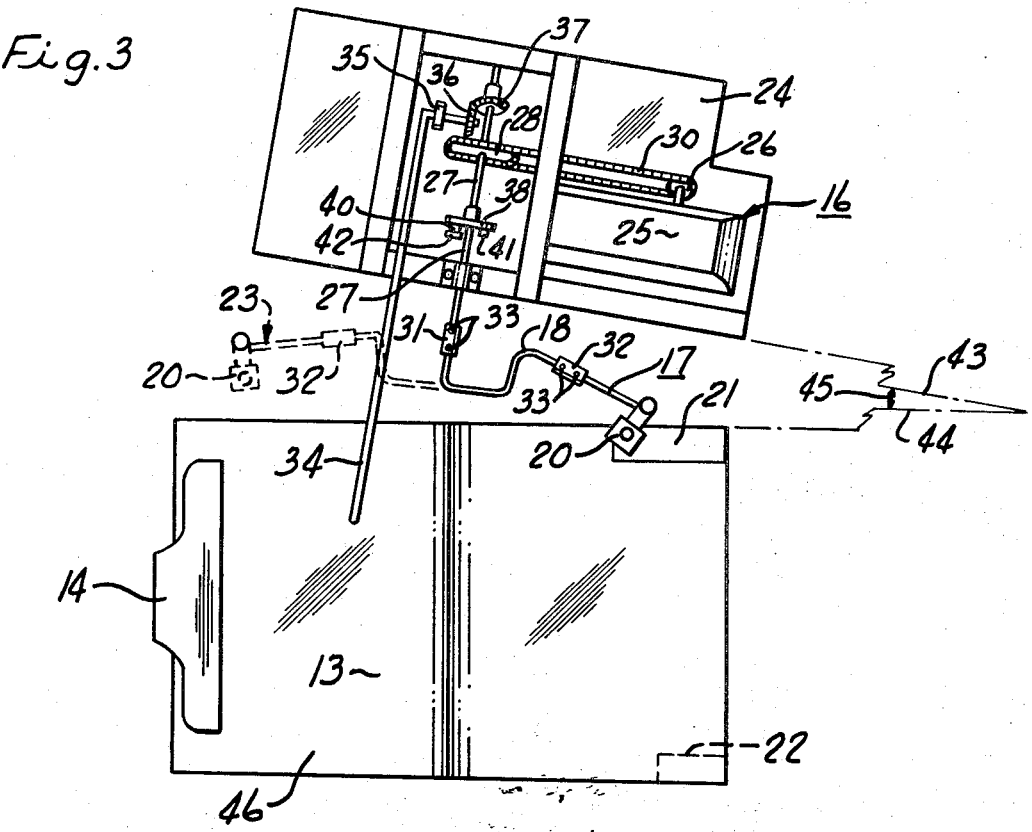
FIG. 3 is a plan view of the motor drive means and page turning arm of the display apparatus of FIG. 1.

Specific reference is now made in connection with the plan view shown in FIG. 3 wherein there is shown the detail comprising the motor drive means 16 and the page turning arm 17. It should be understood that any suitable means for driving the arm 17 in a reciprocal manner from the position shown in FIG. 3 in an arcuate path 180° shown in the dotted line configuration at 23 and thence back to the original position of FIG. 3 can be employed. However, in the means shown in FIG. 3, there is provided the base frame 24 to which is secured the motor 25 having the drive output 26 which drives the longitudinal shaft 27 by means of the large gear 28 connected to the output gear 26 of the motor 25 by means of the chain drive 30. The shaft 27 is supported by simple bearings at either end with its forward end connected by means of the variable telescopic coupling 31 to the page turning arm 17.

The page turning arm 17 may also be provided with an adjustable telescopic coupling 32 so that adjustments may be made in the length of the page turning arm 17 as well as its relative distance from the motor drive means base 24. In this manner, the magnetic attracting means 20 may be properly positioned in the upper right-hand corner no matter the width and length dimensions of the book 13 secured within the chamber 12 by means of the book clip 14. In this connection, it is also possible to adjust the book 13 within the book clip 14 to position the upper corner of each of the pages of the book relative to the magnetic attracting means 20 and thus, possibly eliminate the need for the adjustable telescopic type coupling shown at 31. However, it is necessary to have some adjustment whether by means of moving the base 24 of the motor drive means or being able to extend or shorten the length of the page turning arm 17 by means of the adjustable telescopic couplings 31 and 32 in order that the magnetic attracting means 20 may properly be placed over the magnetic attracting means 21 of each of the pages of the book 13 being employed and secured within the chamber 12 by means of the book clip 14.

The adjustable telescopic couplings 31 and 32 are comprised of two or more tubular members which are slidable one within the other and may be so adjusted and thereafter secured in position by means of the set screws 33.

It should also be noted in FIG. 3 that an optional provision may be provided, if desirable, to be operative from the motor drive means for holding down each consecutive page after it has been completely turned by the page turning arm 17. Such device takes the form of hold down arm 34, the outer end of which is positioned on the left-hand page as turned by the page turning arm 17. The inner end of arm 34 is provided with suitable bearing means indicated at 35 to support the page hold down arm 34 for rotational movement upwardly through an arcuate distance of approximately 90° wherein the arm 34 is substantially in a vertical position. This position of the arm 34 is at the time when the page turning arm 17 is in the dotted line position shown at 23 in FIG. 3. The inner end of arm 34 is provided with a bevel gear 36 which is in engagement with the bevel gear 37 on shaft 27, so that upon rotation of the shaft 27, the arm 34 will be caused to rotate in an upward direction away from the book 13.

From the foregoing, it can be readily seen that upon operation of the page turning arm 17, the page hold down arm 34 will be operated to move upwardly out of the way of the arm 17 to permit the passage of the latter, which action is reversed upon return of the page turning arm 17 to its original normal position and the page hold down arm 34 will return to its position as shown in FIG. 3. The forward end of the page hold down arm 34 may be made of transparent material in order to not obstruct or block out any of the printed intelligence on the left-hand pages of the book 13, as indicated at 46.

Again, reference is made to FIG. 3 pertaining to the shaft 27 in which there is also provided the disc 38 which is secured to the shaft 27 by any suitable means. Disc 38 is provided with the protrusions 40 and 41 which are set to operate the limit switch means 42. As will be explained in more detail later, the protrusions 40 and 41, upon rotation of the page turning arm 17, operate the limit switch means 42 to perform the functions of reversing the operation of the motor 25 when the arm 17 is in the dotted line position shown at 23 as well as shutting off the operation of motor 25 when the arm 17 is in the position shown in FIG. 3.

One important aspect in connection with the operation of the motor drive means and the page turning arm 17 is for the purpose of sequentially turning the pages of the book in the direction of the circumscribed arcuate path of the arm 17. It can be seen particularly in connection with FIG. 3 that when the arm rotates through this arcuate path from its position as shown in FIG. 3 to that shown in dotted line at 23, the end of the arm 17 at the point of the magnetic attracting means 20 is considerably above the top edge of the book 13. The direction of movement of the arm 17 is represented by the line 43 in FIG. 3 which is parallel to the longitudinal side of the base 24 of the forward drive means or perpendicular to the direction of the shaft 27. On the other hand, line 44 represents the longitudinal direction of the top edge of the book 13 so that the angle 45 represents the difference in direction of movement of the pages versus the page turning arm as the former are sequentially turned. It is necessary that the arm 17 moves in an arcuate path 43 transverse relative to the top edge of the book 13 so that the magnetic attracting means 20 will disengage itself from the magnetic attracted means 21 from the upper right-hand corner of each page at that point wherein the page, due to its own weight and gravity, will continue to pass over and position itself on the left-hand side of the book 13 and on top of the book clip 14. Thus, the extent of the angle 45 as depicted in FIG. 3 is predetermined by the point at which the page has sufficient weight due to gravity to properly fall to the left side of the book. This point is depicted on the perspective view in FIG. 4 wherein it is shown that the arm 17 is in a substantially upright vertical position wherein the magnetic attracting means 20 is practically disengaged from the magnetic attracting strip 21 due to the fact that the arm 17 is actually swinging in a path transverse to the direction of movement of the pages of the book 13. Thus, FIG. 4 shows the approximate position of the page turning arm 17 when the magnetic attracting means 20 will disengage itself from the page being turned to permit the latter to proceed to the position indicated at 46. Actually, the page turning arm 17 in the position shown in FIG. 4 has just commenced to pass its vertical upright position.

Figure 5:
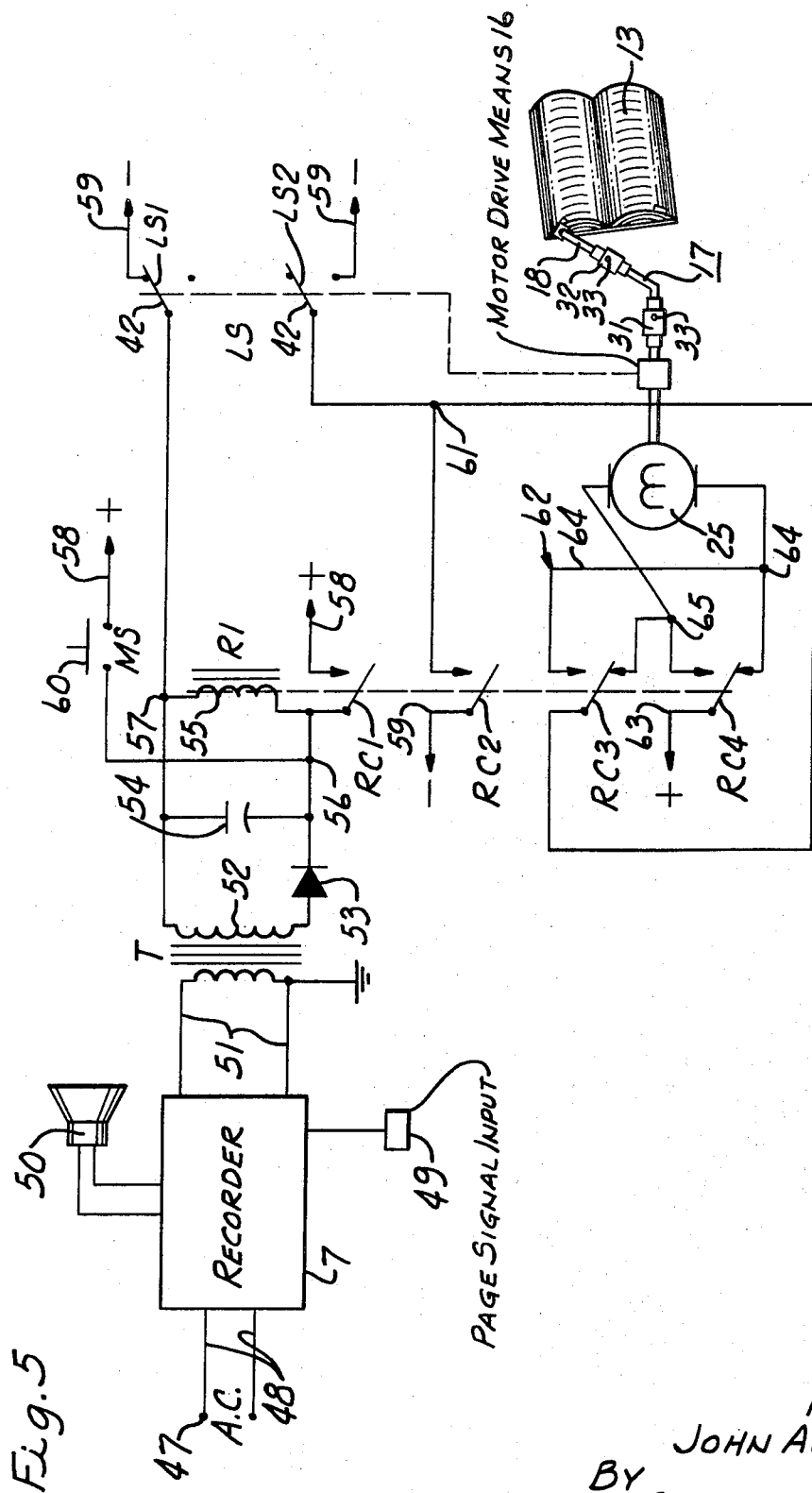
FIG. 5 is a schematic diagram of the control circuit for operation of the page turning arm in predetermined relation with the reproduced sonant stored intelligence.

Reference is now made in connection with FIG. 5 wherein there is shown the control circuit means for operating the motor drive means and the page turning arm 17 to turn pages of the book 13 in a consecutive manner in predetermined relation with the aurally produced sound from the recording tape positioned in the cassette tape player 7. The tape player 7 is adapted to receive power from an AC source indicated at 47 by means of line 48. The tape recorder 7 of the cassette type may be either a single recording channel or double recording channel tape recording system. In the single recording channel system, the inaudible signals for operation of the motor drive means may be placed on the same recording track on a recording tape medium as is the sonant stored intelligence. On the other hand, if a tape recorder is employed having a dual recording track system for purposes of stereophonic sound reproduction, one track can be used for purposes of reproducing through the speaker 50 the sonant stored intelligence while the other track of the recording tape medium may be employed for storage of the signals used to operate the control circuit means which controls the page turning arm 17 through the control circuit means in a predetermined relation with the aurally produced sound from the recording tape medium.

In the system shown, means is provided for the sonant stored intelligence to be heard by the person using the aparatus 1 by means of the speaker 50. Also, this output or the output of the second channel, if a dual channel system tape recorder is being utilized, is connected by means of lines 51 to the step up transformer T at 52. The purpose of the transformer 52 is to amplify the signal received from the tape recorder in the form of an irregular shaped pulse which is thereafter rectified by means of diode 53 and filtered through capacitor 54. The pulse is of positive magnitude and of sufficient duration so that it energizes the relay coil 55 of relay R1 one end of which is connected by means of line 57 to transformer 52 and negative biased through limit switch means 42 in the form of limit switch LS and its contact LS1, whereas its other end is connected by line 56 to the cathode of the diode 53.

Upon energizing relay R1, contact RC1 of relay R1 will be placed in closed position and constitutes a holding contact in maintaining relay coil 55 energized by means of positive biasing provided at line 58. It should be noted that push button switch 60 also provides immediate positive biasing by means of line 58 through line 56 to operate relay coil 55 on a manual basis rather than from a signal from the output 51 of the tape player 7.

Relay R1 has three additional contacts RC2, RC3 and RC4. It can be seen that contact RC2 provides for negative biasing through line 61 which is connected to limit switch LS at contact LS2 which contact also provides for negative biasing when not being provided through contact RC2. Line 61 is also connected through contact RC3 of relay R1 to the reversing circuit generally shown at 62 for the motor 25. On the other hand, line 63 is connected to positive biasing as shown through contact RC4 of relay R1 to the other side of the reversing circuit 62 for motor 25. It should be understood that the reversing circuit 62 consists of two lines, line 64 and line 65, each of which are connected to one side of motor 25. Each line 64 and 65 has a pair of contacts, one contact of each pair being one of the poles of the respective relay contacts RC3 and RC4 of relay R1. Thus, the direct current motor 25 can be caused to operate in one direction or in the other depending upon the position of contacts RC3 and RC4 which reverse the polarity and therefore operation of motor 25 by means of the reversing circuit 62.

A brief explanation will now be given of the operation of the control circuit means as shown in FIG. 5. As previously mentioned, the pulse signal as prerecorded on the tape medium is received along line 51 and amplified by means of transformer 52 and thereafter rectified and filtered by means of diode 53 and capacitor 54. As also previously indicated, the rectified pulse is of such duration as to engergize coil 55 of relay R1 and limit switch LS is in the position as shown in FIG. 5 with its contact LS when connected to negative biasing. With limit switch LS in this position, page turning arm 17 is in the position as shown in FIG. 5 ready to turn a page in the book 13.

Operation of relay R1 closing contacts RC1 and RC2 and moving contacts RC3 and RC4 to their upper positions and is held in its energized position by means of holding contact RC1 connected to positive biasing by means of line 58. By the same token, motor 25 is caused to operate page turning arm 17 through motor drive means 16 since negative biasing is provided through motor 25 by means of line 59 through contact RC2, thence through line 61 to contact RC3 and line 64 to motor 25. On the other hand, positive biasing is provided by means of line 63 through contact RC4 and thence by line 65 to the opposite side of motor 25. Upon page turning arm 17 reaching its complete arcuate cycle completing the page turning operation, the limit switch is contacted by rotating arm 17 as depicted in FIG. 3 to cause limit switch LS to take its second possible position with contact LS2 being placed in connected relation with line 59 to provide substituted negative biasing for line 61. By the same token, LS1 of limit switch LS is placed in its open position so that negative biasing is not provided through line 57 to relay coil 55. Thus, all the contacts RC1 through RC4 drop to their lower position as indicated in FIG. 5 and contact RC2 does not provide further biasing through line 59 to line 61.

It can be seen that in view of the fact that contacts RC3 and RC4 are placed in their second possible position, the biasing to motor 25 is reversed to reverse the direction of operation of motor 25. In this position, as shown, negative biasing is provided by line 61 through contact RC3 to line 65 whereas positive biasing is provided by line 63 through contact RC4 and line 64 to the opposite side of motor 25. Reverse operation of motor 25 causes the page turning arm 17 to return to its original position, as shown, to engage through its magnetic attracting means 20 the next page of the book 13. The operation of motor 25 will stop upon engagement of the next consecutive page in view of the operation again of limit switch LS placing the contacts of this limit switch in their original positions as shown in FIG. 5, thus opening contact LS2 cutting off negative biasing to motor 25 by means of line 59. In order to operate motor 25, either manual button 60 must be pushed or another pulse must be received along line 51 from tape recorder 7 to again energize relay R1.

Reference should be made of the page signal input 49. This is the means by which a signal is supplied to the tape recorder tape medium to actuate the circuit control means. In practice, the signal may be applied in the form of any signal or this input may be merely a distorted signal such as when input 49 may be a knob which is touched for a short duration of time to provide an input signal on the tape of sufficient magnitude as to be amplified and operate relay R1.

It should be obvious to those skilled in the art that the relay R1 as an electrical component of the control circuit may be easily substituted by any other device suitable for operating motor 25. One such example would be the combination of silicon control rectifiers or field effect transistors wherein the signal from the tape recorder 7 will operate such a device in the manner of a switch to bring about effective and proper biasing through the reversing circuit 62 for operation of the motor 25.

In this connection there is shown in FIG. 6 a modified circuit as the circuit control means for operating the motor 25 using such solid state devices, in this case, transistors Q1 and Q2. The flip-flop circuit shown at 70 is of the convention type well known in the art technically termed as a bi-stable multivibrator circuit wherein switching of the circuit occurs when a negative pulse is applied along input line 71 which causes a change in state turning the on-transistor off. Another such pulse will cause the reverse action to take place so that there is a change of state back to the original state.

As in the case of the circuit of FIG. 5, the pulse is received along lines 51 from tape player 7 through transformer T wherein it is rectified and filtered by means of the diode and capacitor. The pulse causes the operation of relay R2 which has contact RC1 which is brought into engagement with contact point 72 of line 71 for a period of duration equal to the length of the pulse. For purposes of explanation, in the flip-flop circuit 70, Q2 is in a conducting state so that the negative pulse that is, a pulse with a negative magnitude, along the line 71 causes transistor Q1 to be placed in a conducting state thereby shutting off Q2. As the result, motor 25 is placed into operation, and in this case it should be noted that motor 25 is provided with a center tap winding as indicated at 73 for operation as a center tap motor. After the page turning arm 17 has reached one-half of its cycle or has traveled an initial arcuate distance of approximately 180°, limit switch 42 will be operated from the position shown in FIG. 6 to the position wherein contact LS1 is closed and contact LS2 is open. This causes the reverse operation of motor 25 in view of the negative ground connection provided from line 74 to be connected through contact LS1 to line 71. Since transistor Q2 is not in operation, this negative voltage applied to the base of Q2 causes it to conduct thereby shutting off the operation of transistor Q1. Thus, motor 25 is caused to operate in a reverse direction to place the page turning arm 17 in its original position wherein the limit switch 42 is again operated to place its contacts in the position shown in FIG. 6 wherein LS1 is open and LS2 is closed. As can be seen from examination of the circuit of the flip-flop 70, transistor Q2 is not shut off in view of the operation of limit switch 42 but rather the value of the resistance in the circuit for resistor 75 is chosen so that upon closing contact LS2, substantially all of the current is drawn through resistor 75 rather than through motor 25 thereby causing the operation of motor 25 to cease. Thus, upon receiving another pulse along lines 51 for operating the relay R2, it can be readily seen that the sequence of operation will again be repeated with transistor Q1 being turned on with transistor Q2 being turned off.

The foregoing explanation makes it quite clear the fundamental operation of the audio-visual apparatus 1 comprising this invention wherein the reproduced sonant intelligence stored on the tape medium is programmed to operate in conjunction with the page turning arm 17 so that a person using the apparatus can follow visually the same intelligence as found in the book 13 placed within the apparatus. Upon receiving the proper signal on the tape medium or any other suitable signal generating means, the page turning arm 17 will be placed in operation to turn in sequential order the pages of book 13 consistent with the intelligence aurally produced for purposes of teaching and instruction.

I claim:

1. An audio-visual book display apparatus comprising a housing containing a forward portion adapted to receive for visual observance a visual media as in the form of a book having a plurality of pages and said housing further containing means in its rearward portion to reproduce sonant stored intelligence maintained on a sonant recording medium, control circuit means for sensing a series of pre-recorded synchronizing signals contained on said sonant recording medium at predetermined selective intervals, a book having a plurality of pages, motor drive means in said housing connected to reciprocally drive a page turning arm having magnetic means at its outer end to engage magnetic attracted means on any one of said book pages, said page turning arm disposed at a transverse angle relative to longitudinal width of said book whereby said arm is angularly positioned in such a manner as to releasably disengage said magnet means from said magnetic attracted means after said page reaches the apex of its arcuate path of travel and begins its downward descent at which point said arm is moved out of intersection with the transverse and vertical plane of said book, said motor drive means responsive to said signals through said control circuit means to rotate said page turning arm in a predetermined relation with the aurally produced sound from said recording medium, a direct current motor included in said motor drive means, said control circuit means including reverse polarity switching means connected to initially supply power to reverse the direction of said motor, and a limit switch having limits defined by the length of the arcuate path of travel of said page turning arm and operative on said reverse switching means to cause a change in direction of and thereafter supply power to said motor, said limit switch again operative to extinquish the power supply to said motor after said change of motor direction.

2. The audio-visual display apparatus of claim 1 characterized by a relay comprising said reverse polarity switching means.

3. The audio-visual display apparatus of claim 1 characterized by a flip-flop circuit comprising said reverse polarity switching means.

4. An audio-visual book display apparatus comprising a housing having a forward portion adapted for receiving for visual observance a visual media in the form of a book having a plurality of pages and said housing further containing means in its rearward portion to reproduce sonant stored intelligence maintained on a sonant recording medium, a book having a plurality of pages, and an adjustable page turning arm for turning over said book pages and having magnetic means at its outer end to engage magnetic attracted means on any one of said book pages, said page turning arm disposed at a transverse angle relative to the longitudinal width of said book whereby said arm is angularly positioned in such a manner as to releasably disengage said magnet means from said magnetic attracted means after said page reaches the apex of its arcuate path of travel and begins its downward descent at which point said arm is moved out of intersection with the transverse and vertical plane of said book, a motor drive means connected to rotate said arm in a forward and then reverse direction through an arcuate path of travel, control circuit means for detecting a pre-recorded synchronizing signal on said recording medium and including a direct current motor, switching means responsive to said synchronizing signal to supply power from a power source to said motor to operate the latter in said forward direction, said switching means also operative to reverse the polarity of said motor, and a limit switch connected to said switching means and to said motor and operative on said switching means when said arm has reached the full extent of its forward travel to reverse said motor polarity and supply power to said motor during said reverse direction and thereafter stop the same when said arm has reached the full extent of its reverse travel.

5. The audio-visual display apparatus of claim 4 characterized by a tape recorder comprising said reproducing means and adapted to record and reproduce said intelligence on a two-track magnetic recording tape comprising said sonant recording medium, said intelligence recorded on one track of said tape and said synchronizing signals recorded on the other track of said tape.

6. The audio-visual display apparatus of claim 4 characterized by adjustable means to vary the extended length of said arm from said motor drive means to accomodate said magnetic means for various sizes of visual media.

7. The audio-visual device of claim 6 characterized by an adjustable telescopic section in said page turning arm comprising said adjustable means to extend said arm forwardly or rearwardly to adjust the same relative to the dimensional extent of said visual media.

8. The audio-visual display apparatus of claim 4 characterized by clamping means positioned in the bottom of said forward portion to adjust said visual media therein relative to said page turning arm and hold said visual media secure when said motor drive means and said arm are in operation.

9. The audio-visual display apparatus of claim 4 characterized by a holding arm operable by said motor means to hold down a page immediately turned over by said page turning arm as the latter returns to its original position.

10. The audio-visual display apparatus of claim 4 characterized by a metal element connected to the upper corner of each of said pages comprising said magnetic attracted means.

11. The audio-visual display apparatus of claim 10 characterized by a metal element connected to the lower corner of each of said pages as an equalizing weight to aid in the turning of said pages by said page turning arm.

* * * * *